United States Patent [19]

Katsumata

[11] Patent Number: 4,656,584
[45] Date of Patent: Apr. 7, 1987

[54] X-RAY TOMOGRAPHIC APPARATUS AND METHOD USING PARALLEL A/D CONVERSIONS OF DETECTOR CHANNEL SIGNALS

[75] Inventor: Kenichiro Katsumata, Ootawara, Japan

[73] Assignee: Kabushiki Kaisha Toshiba, Kawasaki, Japan

[21] Appl. No.: 637,275

[22] Filed: Aug. 3, 1984

[30] Foreign Application Priority Data

Oct. 31, 1983 [JP] Japan .................................. 58-205680

[51] Int. Cl.4 .............................................. G06F 15/42
[52] U.S. Cl. .................................................... 364/414
[58] Field of Search ................. 364/414; 250/901, 445, 250/358

[56] References Cited

U.S. PATENT DOCUMENTS

| | | | |
|---|---|---|---|
| 4,055,767 | 10/1977 | Allemand | 250/385 |
| 4,068,306 | 1/1978 | Chen | 364/414 |
| 4,075,490 | 2/1978 | Kowalski | 250/445 |
| 4,075,491 | 2/1978 | Boyd | 250/445 |
| 4,076,985 | 2/1978 | LeMay | 364/414 |
| 4,138,611 | 2/1979 | Hounsfield | 364/414 |
| 4,259,721 | 3/1981 | Kuznia | 364/414 |

Primary Examiner—Jerry Smith
Assistant Examiner—Gail O. Hayes
Attorney, Agent, or Firm—Finnegan, Henderson, Farabow, Garrett & Dunner

[57] ABSTRACT

In an X-ray scanning apparatus, an X-ray detector includes a plurality of detection channels, e.g., 320 channels. Those detection channels are electrically divided into two subchannel groups. Each of those subchannel groups involves a peripheral detection region and a central detection region. An A/D conversion is sequentially performed as follows. An X-ray transmission signal detected in the peripheral channel region is first A/D-converted, and an X-ray transmission signal derived from the central channel region is finally A/D-converted, so that an artifact may be avoided in a resultant tomographic image.

18 Claims, 9 Drawing Figures

CONVENTIONAL SYSTEM        SYSTEM OF THE INVENTION

10mm SLICE SIZE

5mm SLICE SIZE

2mm SLICE SIZE

FIG. 8B

CONVENTIONAL SYSTEM  SYSTEM OF THE INVENTION

10mm SLICE SIZE

5mm SLICE SIZE

2mm SLICE SIZE

X-RAY TOMOGRAPHIC APPARATUS AND METHOD USING PARALLEL A/D CONVERSIONS OF DETECTOR CHANNEL SIGNALS

BACKGROUND OF THE INVENTION

1. Field of the Invention

The present invention relates to an X-ray scanning apparatus of the type associated with computerized tomography.

2. Description of Prior Art

The X-ray scanning apparatus set forth in the preamble is known as an X-ray CT apparatus. It is also known as "third-generation X-ray CT apparatus". In such a third-generation X-ray CT apparatus, fan-shaped X-ray beams are projected toward an object, e.g., a patient, and an X-ray detector having a plurality of detection channels is positioned to receive those fan-shaped X-ray beams which have penetrated through the object and to derive a plurality of X-ray transmission signals therefrom during the revolution examination. A data acquisition unit employing a multiplexer and an analogue-to-digital (A/D) converter is provided in which a plurality of analogue X-ray transmission signals are transferred through the multiplexer to the A/D converter so as to convert the analogue X-ray transmission signals into digital transmission signals. A reconstruction device is provided to process the digital transmission signals from the A/D converter so as to reconstruct a computerized tomographic image of the object. In general, the sequence of analogue-to-digital conversion is performed from "a central channel region" to "a peripheral channel region" of the X-ray detector. It should be noted in the present specification that the above-described "central channel region" of the detection channels of the X-ray detector is defined as the detection channels located around the center of the plurality of detection channels, and the "peripheral channel region" is defined as the detection channels located near both ends of the plurality of detection channels.

A main reason why such an A/D conversion sequence has been employed in conventional X-ray scanning apparatus is that the longer a time period becomes during which the X-ray transmission signals are detected and thereafter A/D-converted via the multiplexer, the greater are the noise signals mixed with the A/D-converted transmission signals. In addition to the above-described fact, it is known that the detected transmission signal, or detection signal which is derived from the central channel region causes an artifact, as compared with the detection signal derived from the peripheral channel region. Accordingly, the total amount of noise signals of the detection signal is reduced by A/D-converting the X-ray transmission signal that is derived from the central channel region prior to one derived from the peripheral channel region. That the resultant tomographic image is not to any extent adversely effected by the artifact There is another proposal for increasing the A/D conversion rate by parallel operations of a plurality of A/D converters.

However, the conventional X-ray scanning apparatus owns the other problems. That is, when the detection signals from the central channel region are A/D-converted at the beginning of the A/D conversion sequence, the slewing rate of the operational amplifiers in the data acquisition unit must be suppressed to a lower value, because a charging current flows through filters in the data acquisition unit for the sake of noise reduction.

The input terminals of the A/D converters, on other hand, are kept to the ground potential when no input signal is applied to those input terminals. Usually the detection signals which are to be A/D-converted at the beginning, have rather large amplitudes. Accordingly, if, as described above, the slewing rate is suppressed to a lower value, the A/D converters cannot sufficiently follow such large input signals. As a result, when the above-described sequence of A/D conversion from the central channel region to the peripheral channel region is employed, artifacts may occur in the resultant tomographic image of the conventional X-ray scanning apparatus.

Further, in a data acquisition unit having a plurality of A/D converters, the central channel region of the respective detector is normally divided into two subregions, taking acount the design limitation for the detector and the multiplexers that receive the X-ray transmission signals and are coupled to the A/D converters. Since, for example, two A/D converters whose characteristics are different from each other are coupled to the subregions of the detector, a transition consequently exists in the A/D-converted transmission signals with respect to the central channel region, so that an artifact appears in a portion of the tomographic image which corresponds to the central channel region. Accordingly, great attention has been paid only to an improvement of the characteristics of the A/D converters.

It is therefore an object to provide an X-ray scanning apparatus in which the tomographic images having no artifact can be obtained by introducing a new sequence of A/D conversion, taking account inherent problems of a data acquisition unit having a plurality of A/D converters. Those inherent problems are known as differences in the characteristics of the A/D converters such as the linearity, offset value and so on.

SUMMARY OF THE INVENTION

These objects may be accomplished by providing an X-ray scanning apparatus comprising, a generator for producing a fan-shaped X-ray, a detector including a plurality of detection channels having at least central and peripheral channel regions with respect to an entire detection region thereof, and for detecting the fan-shaped X-ray as an X-ray transmission image that has been penetrated through an object under investigation so as to transform the X-ray transmission image into an X-ray transmission data signal, the detection channels being electrically divided into at least first and second subchannel groups, each of which involves the central and peripheral channel regions, a data acquisition unit including at least first and second multiplexers each coupled to the corresponding first and second subchannel groups of the detector respectively, first and second A/D converters connected to the corresponding first and second multiplexers respectively, and a system control unit connected to the first and second multiplexers and A/D converters, whereby A/D conversions of the first and second A/D converters are controlled under the system control unit in such a manner that the X-ray transmission data signals derived from the peripheral channel regions of the detection channels, are first converted in parallel, a reconstruction unit for reconstructing an X-ray tomographic image of the object by receiving a plurality of X-ray transmission data signals that have been converted by the first and second A/D converters, and
a monitor for displaying the tomographic image of the object.

Further an X-ray scanning apparatus according to the invention comprises,
a generator means for producing a fan-shaped X-ray;
a detector means including a plurality of detection channels having at least central and peripheral channel regions with respect to an entire detection region thereof, and for detecting the fan-shaped X-ray as an X-ray transmission image that has been penetrated through an object under investigation so as to transform the X-ray transmission image into an X-ray transmission data signal, the detection channels being electrically divided into at least equal four subchannel groups based upon odd and even-numbered channels,
a data acquisition unit including at least first, second, third and fourth preamplifier/integrators each connected to the corresponding first, second, third and fourth subchannel groups respectively, first, second, third and fourth multiplexers each connected to the corresponding first, second, third and fourth preamplifier/integrators respectively, first, second, third and fourth A/D converters each connected to the corresponding first, second, third and fourth multiplexers respectively, and a system control unit connected to all of the preamplifier/integrators, multiplexers and A/D converters, whereby A/D conversions of the first, second, third and fourth A/D converters are controlled under the system control unit in such a manner that the A/D converters are operated in parallel, and the X-ray transmission data signals are first converted, the data signals being derived from the peripheral channel regions of said four subchannel groups having the odd and even-numbered channels.
a reconstruction unit for reconstructing a tomographic image of the object by receiving a plurality of X-ray transmission data signals that have been converted by the first, second, third and fourth A/D converters, and
a monitor for displaying the tomographic image of the object.

BRIEF DESCRIPTION OF THE DRAWINGS

For a better understanding of these and other objects of the present invention, reference is made to the following detailed description of the invention to be read in conjunction with the following drawings, in which.

DETAILED DESCRIPTION OF THE PREFERRED EMBODIMENTS

The present invention is achieved on the following basis.

The first principle operation is as follows. All channels, e.g., 320 channels of an X-ray detectors are electrically divided into two subchannel groups with respect to a central channel region. A first subchannel group involves one peripheral channel, e.g., channel 1, through one central channel, e.g., channel 160, and a second subchannel group involves another central channel, e.g., channel 161, to another peripheral channel, e.g., channel 320. The sequence of A/D conversion of the detection signals from the X-ray detector 3 is as follows. A first A/D conversion is simultaneously performed for both the detection signals derived from the peripheral channels 1 and 320. Subsequently a second A/D conversion is simultaneously done for both channels 2 and 319. A final (the 160th) A/D conversion is simultaneously effected for both central channels 160 and 161 in parallel.

A second principle operation is as follows. A plurality of channels (320 channels) of the X-ray detectors is first divided into three groups, but finally two subchannel groups are established. That is, the channels 81 to 240 belong to a first subchannel group. Channels 1 to 80 and 241 to 320 belong to a second subchannel group. The sequence of the A/D conversion in this case is as follows. At first, the detection signals derived from channel 81 belonging to the first subchannel group and also from channel 241 belonging to the second subchannel group are simultaneously converted by the respective A/D converter. Finally those from channels 240 and 80 are A/D-converted in parallel.

The third principle operation of the present invention is as follows. The entire channel (320 channels) of the X-ray detector is electrically divided into four groups. A first subchannel group involves odd-numbered channels belonging to channels 1 to 159, i.e., a total of 80 channels. A second subchannel group involves even-numbered channels belonging to channels 2 to 160, i.e., totally 80 channels. A third subchannel group involves odd-numbered channels belonging to channels 161 to 319. A fourth subchannel group involves even-numbered channels belonging to channels 162 to 320. The conversion sequence is as follows. Four detection signals derived from channels 1 (1st subgroup), 2 (2nd subgroup), 319 (3rd subgroup) and 320 (4th subgroup) are simultaneously converted in the respective A/D converter at first. In the final conversion sequence, those signals from channel 159, 160, 161 and 162 are A/D-converted in a parallel conversion mode. In other words, the entire A/D conversion operations are effected from the peripheral channel region (channels 1, 3, 319, 320 etc.) toward the central channel region (channels 159, 160, 161, 162 etc).

Figure 1:
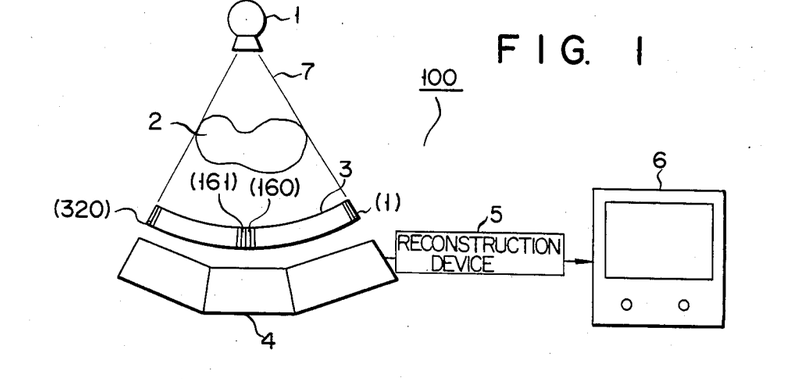
FIG. 1 shows a block diagram of an entire system of an X-ray scanning apparatus according to a first embodiment of the present invention.

FIG. 1 shows a block diagram of an entire system of an X-ray scanning apparatus according to the present invention.

In an X-ray scanning apparatus 100, a fan-shaped X-ray beam 7 irradiated from an X-ray tube 1 is incident upon X-ray detector 3 through an object 2, such as a patient. The X-ray beam 7 is converted into an electric signal for each detection channel of the X-ray detector 3 as an X-ray transmission data signal.

The x-ray transmission data signal derived from each channel of the X-ray detector 3 is input to a data acquisition unit 4, and is A/D-converted into a digital X-ray tranmission signal. This digital signal is delivered to a reconstruction device 5 from which a reconstructed digital signal is supplied to a display device 6, whereby a tomographic image of the object 2 can be displayed based upon the reconstructed digital signal.

A total number of channels of the X-ray detector 3 is selected to be 320 in the present embodiment. The leftmost channel of the X-ray detector 3, viewed in FIG. 1, is defined as a "a channel 320". So, "a right peripheral channel region" may include the channel 1 through approximately the channel 100, "a left peripheral channel region" may involve approximately channel 220 to channel 320, and "a central channel region" may have channel 101 through channel 219. It should be, of course, understood that the above expressions are not meant as absolute definitions, but are used for only convenience.

Figure 2:
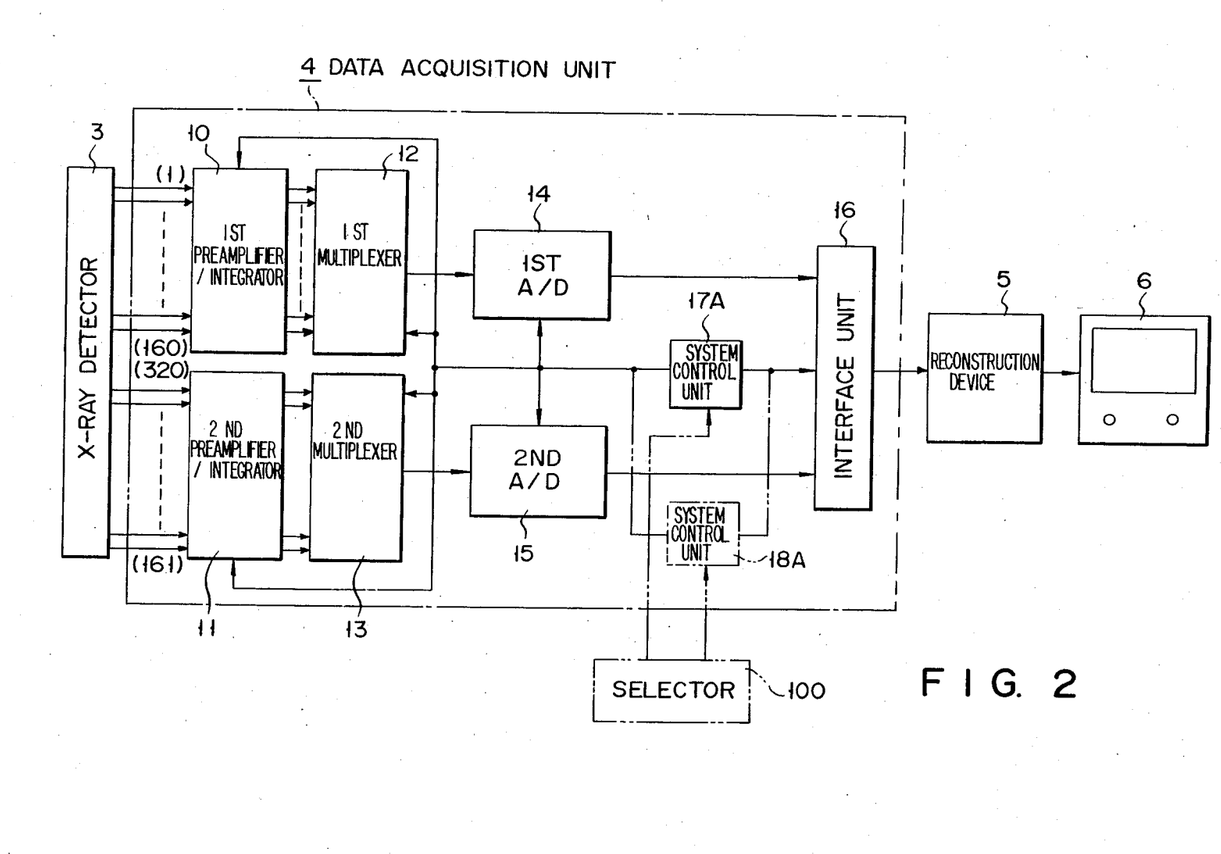
FIG. 2 shows partially a block diagram of the circuit arrangement according to the first embodiment shown in FIG. 1.

FIG. 2 shows partially a block diagram of the first preferred embodiment into which the above-described first principle of the present invention has been introdued. In the block diagram shown in FIG. 2, the X-ray tube 1, the object 2 and the fan-shaped X-ray beam 7 are not shown for convenience and clarity of illumination. The data acquisition unit 4 is composed of: preamplifier/integrators 10, 11, multiplexers 12, 13; A/D converters 14, 15; an interface unit 16; and system control unit 17A.

As previously described, the X-ray detector 3 is constructed of 320 detection channels. In accordance with a first preferred embodiment, those 320 channels are electrically divided to equal subchannel groups. Accordingly, a 1st channel group covers channels 1 to channel 160, i.e., 160 channels in total, and a 2nd channel group involves channel 161 to channel 320, i.e., 160 channels in total. As a result, it should be noted that both central and peripheral channel regions are included in each of the 1st and 2nd channel groups.

As shown in FIG. 2, the 1st channel group is connected to a 1st preamplifier/integrator 10, and the 2nd channel group is connected to a 2nd preamplifier/integrator 11. Those preamplifier/integrators 10 and 11 have 160 terminals for input and output signals respectively. Between a pair of the input and output terminals there is connected a pair of preamplifiers/integrators (not shown in detail). Thus, one X-ray transmission signal derived from the respective detection channel of the X-ray detector 3 can be amplified and integrated. The 1st and 2nd multiplexers 12, 13 are provided such that the output of the 1st preamplifier/integrator 10 is applied to the 1st multiplexer 12 and that of the 2nd preamplifier/integrator 11 is applied to the 2nd multiplexer 13. X-ray transmission signals of the 1st and 2nd multiplexers 12, 13 are applied to the 1st and 2nd A/D converters 14, 15 respectively so as to be A/D-converted to the digital X-ray transmission signals which are then applied to an interface unit 16.

The interface unit 16 temporarily and simultaneously stores each of the X-ray transmission signals that are derived from the 1st and 2nd A/D converters 14 and 15 respectively, and delivers the X-ray transmission signals one by one therefrom to the reconstruction device 5.

A system control unit 17A is provided to control: the 1st and 2nd multiplexers 12, 13; A/D converters 14, 15; and the interface unit 16 so as to perform the above-described series of the operation.

The entire operation of the data acquisition unit 4 will be summarized as follows. The detection signals derived from channels 1 to 160 which belong to the first subgroup are applied in turn through the preamplifier/integrator 10 to the first multiplexer 12. Simultaneously the detection signals derived from channels 161 to 320 which belong to the second subgroup are subsequently applied one by one through the preamplifier/integrator 11 to the second multiplexer 13.

As previously described, these multiplexers 12, 13 are controlled by the system control unit 17A as follows. That is, a sequence of the signal transmission from the 1st multiplexer 12 to the 1st A/D converter 14, and from the 2nd multiplexer 13 to the A/D converter 15 is determined in such a manner that the detection signal derived from channel 1 is first applied to the A/D converter 14 and that from channel 160 is finally applied thereto, and simultaneously the detection signal derived from channel 320 is first applied to the A/D converter 15, and at last that from channel 161 is applied thereto. In other words, the A/D conversions for both detection signals of the 1st and 2nd subgroups are executed in parallel under the control of the system control unit 17A.

Consequently, as a result of the above-mentioned A/D conversion sequence, at first the analogue detection signals derived from the so-called "peripheral channel region," e.g., channels 1, 1, 3 . . . 100 (1st subgroup) and also channels 320, 319, 318 . . . 220 (2nd subgroup) are subsequently A/D converter in the 1st and 2nd A/D converters 14 and 15. At last, the analogue detection signals are A/D-converted which are derived from the so-termed "central channel region", e.g., channels 159, 160 (1st subgroup) and channels 162, 161 in parallel.

There are mainly three reasons why the above sequence of A/D conversion has been introduced in the X-ray scanning apparatus according to the invention.

Figure 3:
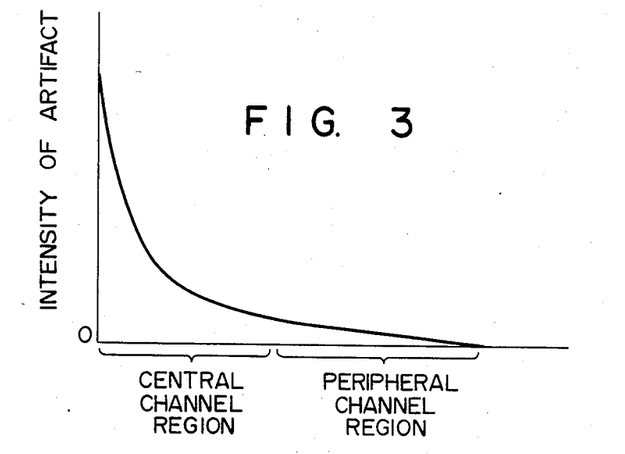
FIG. 3 is a graphic representation of a relation between an occurrence of the artifact and channel regions of the X-ray detector.

As the first reason, it is known that if one of the detector channels incurs a defect during the X-ray beam detection, a ring-shaped artifact may occur in CT image because the beam impinged on the defective channel is rotated as a center. The intensity of the artifact is inversely proportional to the beam distance between the defective channel and the center channel, as shown in FIG. 3. In a system like this invention, one dimensional X-ray transmission profile of a fan-shaped beam through a patient is obtained along the detector at once. These profiles known as projection data are obtained in a lot of views in a scanning plane. The system performs convolution of all projection data and back-projection of the convolved projection data to a two dimentional region, along the inverse beam direction, which is shown in U.S. Pat. No. 4,149,247 or U.S. Pat. No. 4,075,491.

So, if the center channel is defective, all beams of it will pass the center of the region through a whole scan. However, if the outer channel from the center is defective, the fewer beams pass on the ring. That is because the ring shaped artifact appears as shown is FIG. 3, i.e., the center is strong artifact, but the outer is weak one.

Such a ring-shaped artifact occurs when a channel detection is unstable through almost whole scan. The central channel's unstability produces the intense artifact in the center of region.

As the second reason, since the input of the A/D converter before its operation is connected to the ground, a charge current necessarily flows into the capacitor filters of the A/D converter when the first X-ray transmission signal is input in the sequence of A/D conversion. Accordingly, the X-ray transmission signal which is to be A/D-converted at first, may contain more noise than the X-ray transmission signal which is to be A/D-converted later.

As the third reason, it is known that there is substantially no considerable change in the signal levels which are derived from the adjacent detection channels in the X-ray detector 3. That is, since there exists the signal correlation, a higher A/D-conversion precision can be realized if the A/D conversion is subsequently carried out for the X-ray transmission signals derived from the juxtaposed detection channels along the X-ray detector. For instance, when the X-ray transmission signal of channel 101 is A/D-converted in the A/D converter 14 after that of channel 100 is converted therein, there is almost no change in both signal levels between the former transmission signal and the latter one, because of the signal correlation among those transmission signals that are derived from the electrically adjoinning detection channels. As a result, there is an advantage that the response time for the input signals to the A/D converter 14 can be shortened in view of the input characteristics of the A/D converter 14.

To the contrary, when at first, the X-ray transmission signal derived from channel 1 is applied to the A/D converter 14, the A/D conversion precision is considerably decreased, as compared with that for the signals derived from the adjacent detection channels, because the potential of the input terminal of the A/D converter 14 remarkably changes from a zero level to a certain large level.

Under these circumstances, if the A/D conversion is sequentially carried out from the peripheral channel region, e.g., channels 1 and 320, toward the central channel region, e.g., channel 160 and 161, it is possible to prevent the above-described problems from occurring at the beginning of the A/D conversion. In general, there is a little artifact in the resultant tomographic image when the transmission signals from the peripheral channel region are A/D-converted, because, as already explained in the first reason, changes of the CT numbers are smaller than in the central channel region under the same level variation in the detection signals. That is, the above-described A/D-conversion sequence can realize a better tomographic image in which no artifact appears.

Consequently, the present invention can be achieved based upon the above recognition.

A second embodiment will now be described with reference to FIGS. 4 and 5, into which the above-described second principle of the invention has been introduced.

It should be understood that the same reference numerals indicated in FIGS. 1 and 2 are employed as those for denoting the same circuit elements shown in the following drawings.

Figure 4:
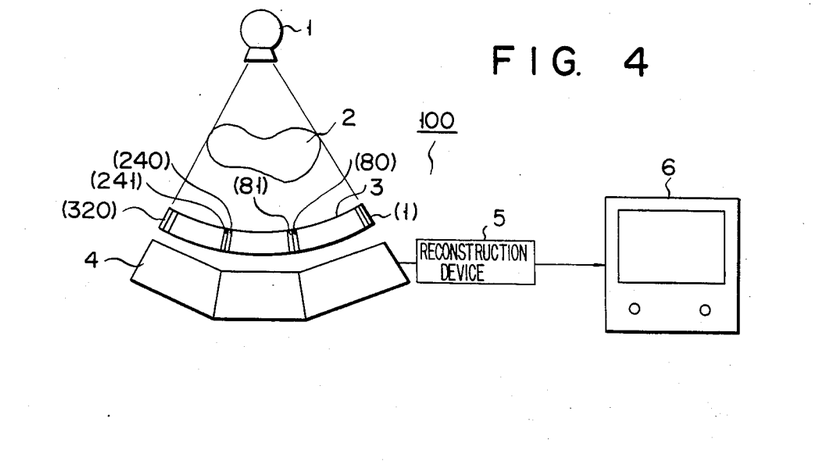
FIG. 4 shows a block diagram of an entire system of an X-ray scanning apparatus according to a second embodiment of the present invention.
Figure 5:
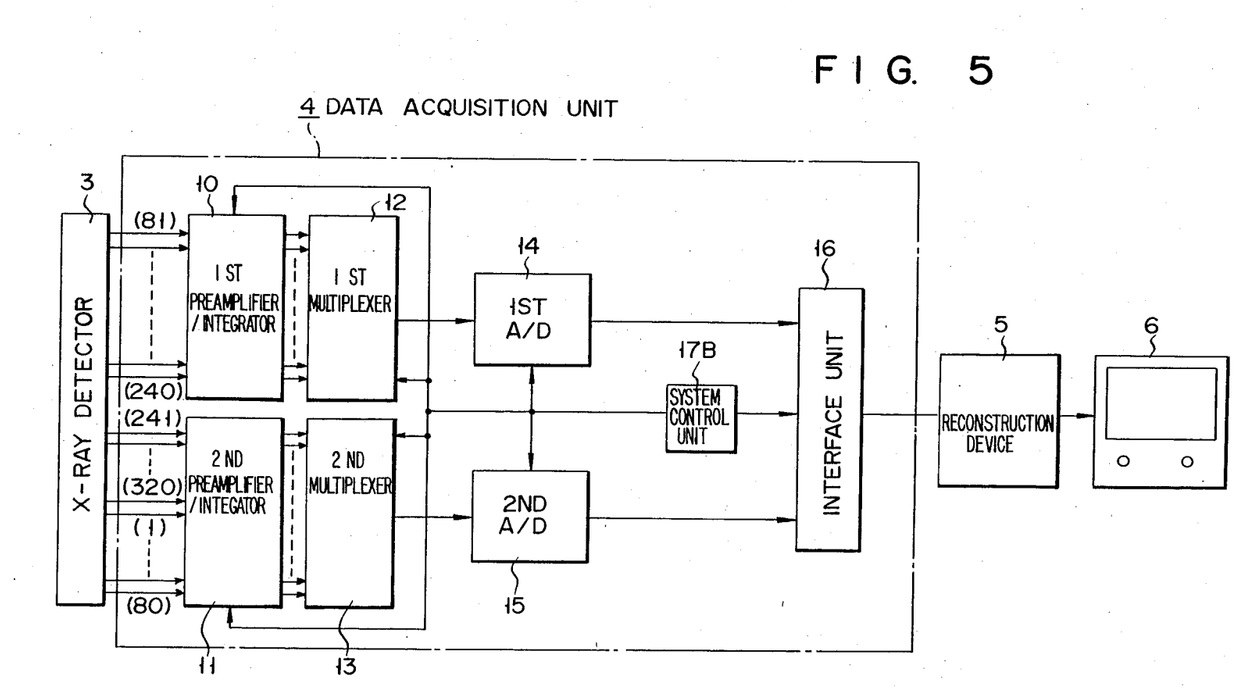
FIG. 5 shows partially a block diagram of the circuit arrangement according to the second embodiment shown in FIG. 4.

In the second preferred embodiment as shown in FIGS. 4 and 5, channel division is done as follow. A 1st channel group, or subgroup includes channel 81 to channel 240 of the X-ray detector 3, and is connected to a 1st multiplexer 12 via a 1st preamplifier/integrator 10.

A 2nd channel group, or subgroup involves channels 241 through 320 and also channels 1 through 80 and is connected to a 2nd multiplexer 13 via a 2nd preamplifier/integrator 11. That is, at first, 320 channels of the X-ray detector 3 are equally divided into three channels groups, and then both the peripheral channels (i.e., channels 1 to 80, and 241 to 320) are combined with each other to establish the 2nd channel group.

Similar to the first preferred embodiment, those multiplexers 12 and 13 are controlled by a system control unit 17B in such a way that the sequence of A/D conversion is determined in the 1st multiplexer 12 from channels 81 to 240, and simultaneously the sequence of A/D conversion is determined in the 2nd multiplexer 13 from channels 241 to 320, and from 1 to 80.

As explained above, after both the transmission signals derived from the 1st A/D converter 14 and the 2nd A/D converter 15 are A/D-converted in parallel, those digital transmission signals are simultaneously fed to the interface unit 16. Those signals are temporarily stored in the interface unit 16. Thereafter, for example, the digital transmission signal of channel 81 is first applied to the reconstruction device 5, and then the digital transmission signal of channel 241 is applied to it. This is also controlled by the system control unit 17B. Namely the function of the system control unit 17B differs from that of the system control unit 17A.

As previously described, the sequence of A/D conversion according to the second embodiment is performed in such a condition that the sequence of A/D conversion for the transmission signals derived from the peripheral channel region is carried out earlier than that for the central channel region as permissibly as possible.

According to the second preferred embodiment, the following considerations are given. That is, since the A/D converters 14 and 15 have inherently different electrical characteristics from each other to some extent, such a characteristic difference may cause the artifact in the obtained tomographic image. To avoid the adverse effect as much as possible, it is decided to make a transition portion between the 1st and 2nd channel groups in the peripheral channel region whereby the tomographic images having substantially no artifact can be obtained (See FIG. 3).

In addition to the above advantages, the following measures are taken in the embodiment. As already explained, the A/D conversion is sequentially done for the physically adjoining channels in order to suppress a change in the signal levels of the adjoining detection signals with respect to the time lapse as permissibly as possible. However, if it is not possible, the A/D conversion is performed for the transmission signals which are derived from the peripheral channel region, e.g., from channels 1 and 320 that are not physically juxtaposed from each other, because these transmission signals may cause substantially no adverse influence to the image quality. As a result, the adverse effect of the artifact can be further diminished.

Generally speaking, there is, on the other hand, a slight possibility that the X-rays which have penetrated through the object 2 are incident upon the most peripheral channels 1 and 320. That is, the X-rays which have not penetrated through the object are directly incident upon them. In this case, the intensities of the fan-shaped X-ray beam represent essentially the same characteristics with respect to channels 320 and 1. Accordingly, when those channels are involved in the 2nd subchannel group and are continuously scanned, it is known as a fact that substantially no difference between the signal levels exists in both transmission signals derived from channels 1 and 320. As a result, since the sequence of A/D conversion has been determined based upon those characteristics, the tomographic images having no artifact can be obtained according to the preferred embodiment.

Figure 6:
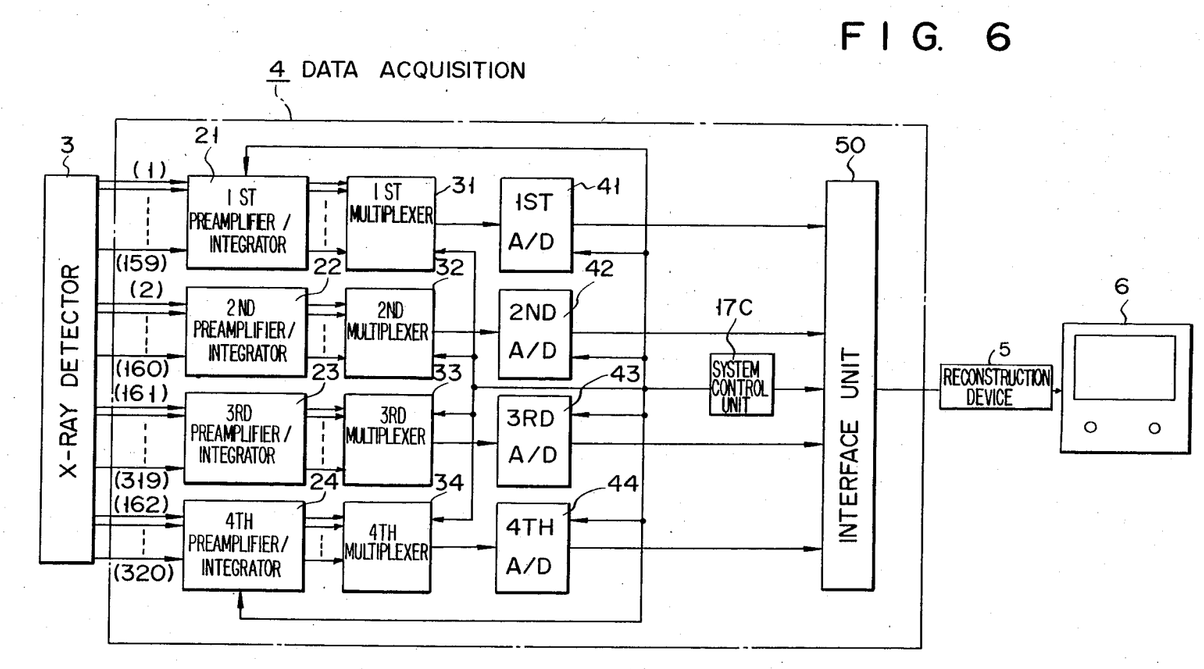
FIG. 6 shows partially a block diagram of the circuit arrangement according to a third embodiment.

A description will now be made of an X-ray scanning apparatus as a third embodiment. FIG. 6 shows a block diagram of the major components of the third embodiment into which the above-described third principle of the present invention has been introduced.

In this embodiment, the channels of the X-ray detector 3 are electrically divided into four subgroups. Those subgroups have the same quantity of the channels. The first subgroup has the odd-numbered channels from channels 1 through 159, e.g., channels 1, 3, 5 ... 157 and 159. Similarly the second subgroup has the even-numbered channels from channels 2 through 160, e.g., channels 2, 4, 6 ... 158 and 160. The third and fourth subgroups have odd-numbered and even-numbered channels from channels 161 to 319, and from 162 to 320 respectively.

As shown in FIG. 6, the first subgroup of the detector 3 is connected to eighty (80) input terminals of the 1st preamplifier/integrator 21. Eighty (80) output terminals of the 1st preamplifier/integrator 21 are connected to eighty (80) input terminals of a 1st multiplexer 31. One output terminal of the 1st multiplexer 31 is connected to a 1st A/D converter 41, an output terminal of which is connected to one of four (4) input terminals of an interface unit 50. An output terminal of the interface unit 50 is connected to the reconstruction device 5 as same as in the previous embodiment.

The second subgroup is connected via a 2nd preamplifier/integrator 22, a 2nd multiplexer 32 and a 2nd A/D converter 42 to the second input terminal of the interface unit 50 in the same way as in the first subgroup. The third and fourth subgroups are similarly connected via 3rd and 4th preamplifier/integrators 23, 24 multiplexers 33, 34 and A/D converters 43, 44 to the third and fourth input terminals of the interface unit 50 respectively.

The system control unit 17C can control the operation timings of all circuit elements in the data acquisition unit 4.

A description will now be made of the operation of the third embodiment.

First, the X-rays that have penetrated through the object 2 are detected by the X-ray detector 3 so as to obtain detection signals, i.e., X-ray transmission signals. Those detection signals are directed to be amplified, integrated, multiplexed, and further to be A/D-converted by the A/D converters 41, 42, 43 and 44 respectively. In other words, the four detection signals are simultaneously and independently pre-processed in the preamplifier/multiplexers, and are thereafter A/D-converted in the A/D converters in parallel operations, so that the four digital detection signals are supplied in parallel to the interface unit 50. For example, during the first A/D conversion period (sequence No. 1) the following four detection signals are converted; in the first A/D converter 41, the detection signal (X-ray transmission signal) derived from channel 1 is converted into a corresponding digital detection signal. In the second A/D converter 42, the detection signal derived from channel 2 is converted. In the third A/D converter 43 the detection signal derived from channel 319 is converted. In the fourth A/D converter 44 the detection signal derived from channel 32 is converted. Those A/D conversion operations are simultaneously performed in each A/D converter 41, 42, 43 and 44, i.e., the parallel A/D conversion operation.

TABLE

| A/D converter | Conversion Sequence | | | | | | | |
|---|---|---|---|---|---|---|---|---|
| | 1 | 2 | 3 | 4 | 5 | ... | 79 | 80 |
| 1st A/D 41 | 1 | 3 | 5 | 7 | 9 | ... | 157 | 159 |
| 2nd A/D 42 | 2 | 4 | 6 | 8 | 10 | ... | 158 | 160 |
| 3rd A/D 43 | 319 | 317 | 315 | 313 | 311 | ... | 163 | 161 |
| 4th A/D 44 | 320 | 318 | 316 | 314 | 312 | ... | 154 | 162 |

As a result, the four digital detection signals that have been simultaneously A/D-converted by the first to fourth A/D converters 41, 42, 43 and 44, respectively, are temporarily stored in the interface unit 50. Thereafter those digital detection signals are transferred one by one to the reconstruction device 5. The transfer sequence of the detection signals is determined in the following manner; the detection signals derived from channels 1, 320, 2, 319, 3, 318, 4, 317 ..., 159, 162, 160 and 161. That is, the detection signals derived from the 1st A/D converter 41, the 4th A/D converter 44, the 2nd A/D converter 42 and the 3rd A/D converter 43 are selected in turn to be transferred into the reconstruction device 5.

The sequence operations in this embodiment can be effected under the control of the system control unit 17C.

It can be understood from the foregoing that the central channel region of channels 159 to 162 is scanned (A/D-converted) at the end of the scanning (conversion) sequence. Accordingly, the advantages that have been described in connection with the previous embodiments can be also provided so that the S/N ratio of the A/D-converted detection signals can be improved, and furthermore the tomographic image having no artifact can be displayed in the monitor 6.

Figure 7:
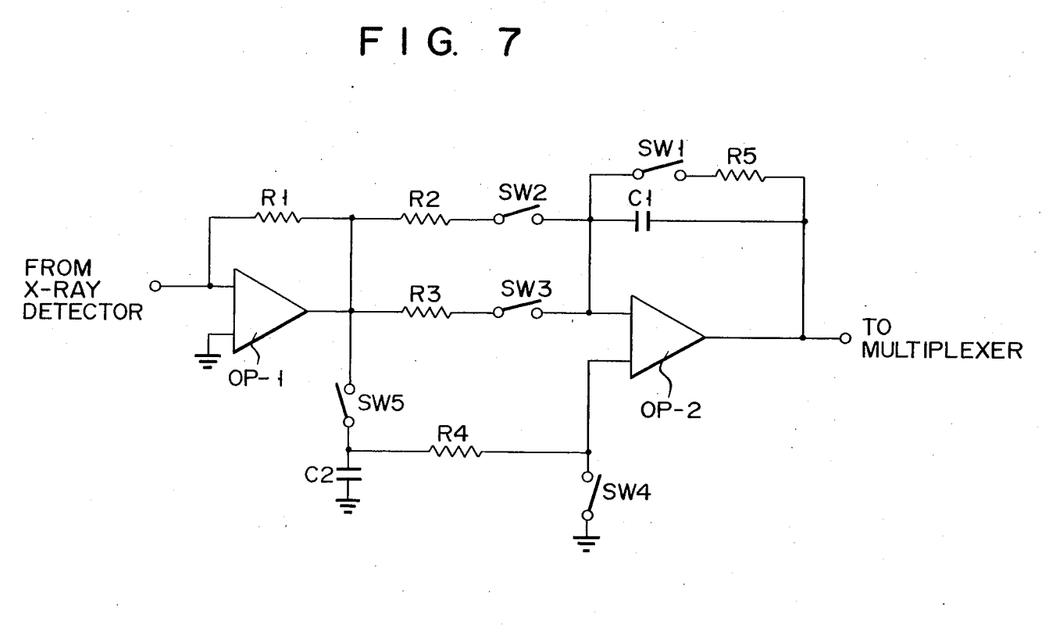
FIG. 7 is a circuit diagram of a preamplifier/integrator which may be employed in the apparatus according to the invention.

FIG. 7 shows a circuit diagram of a preamplifier/integrator that is actually employed in the above-described embodiments. The function of the circuit will now be summarized. The operational amplifier OP-1 and its feed-back resistor R1 mainly function as a preamplifier. The remaining operational amplifier OP-2 and a capacitor C1 mainly function as a integrator.

The technical data of those circuit components is as follows:

| OP-1 | OP-15 | Precision Monolithics Inc. |
|---|---|---|
| OP-2 | OP-07 | Precision Monolithics Inc. |
| SW1~SW4 (analogue switches) | DG308 | SILICONIX |
| SW5 (FET switch) | 2SK18 | TOSHIBA |
| C1 | 0.047 μF | |
| C2 | 10 μF | |
| R1 | 3.75 MΩ | |
| R2 | 3.3KΩ | |
| R3 | 31.9KΩ | |
| R4 | 30KΩ | |
| R5 | 3.3KΩ | |

Another technical data is as follows:

| Multiplexer | TC 4051 | TOSHIBA |
|---|---|---|
| A/D converter* | ADC 76 | BURR-BROWN |

| | | |
|---|---|---|
| (sample hold circuit converter) | ZMP270 ADC 76 | ZELTEX |

*A/D conversion rate: 16 μs/channel
Integration time constant: R3 × G = 0.319 sec.

Figure 8A:
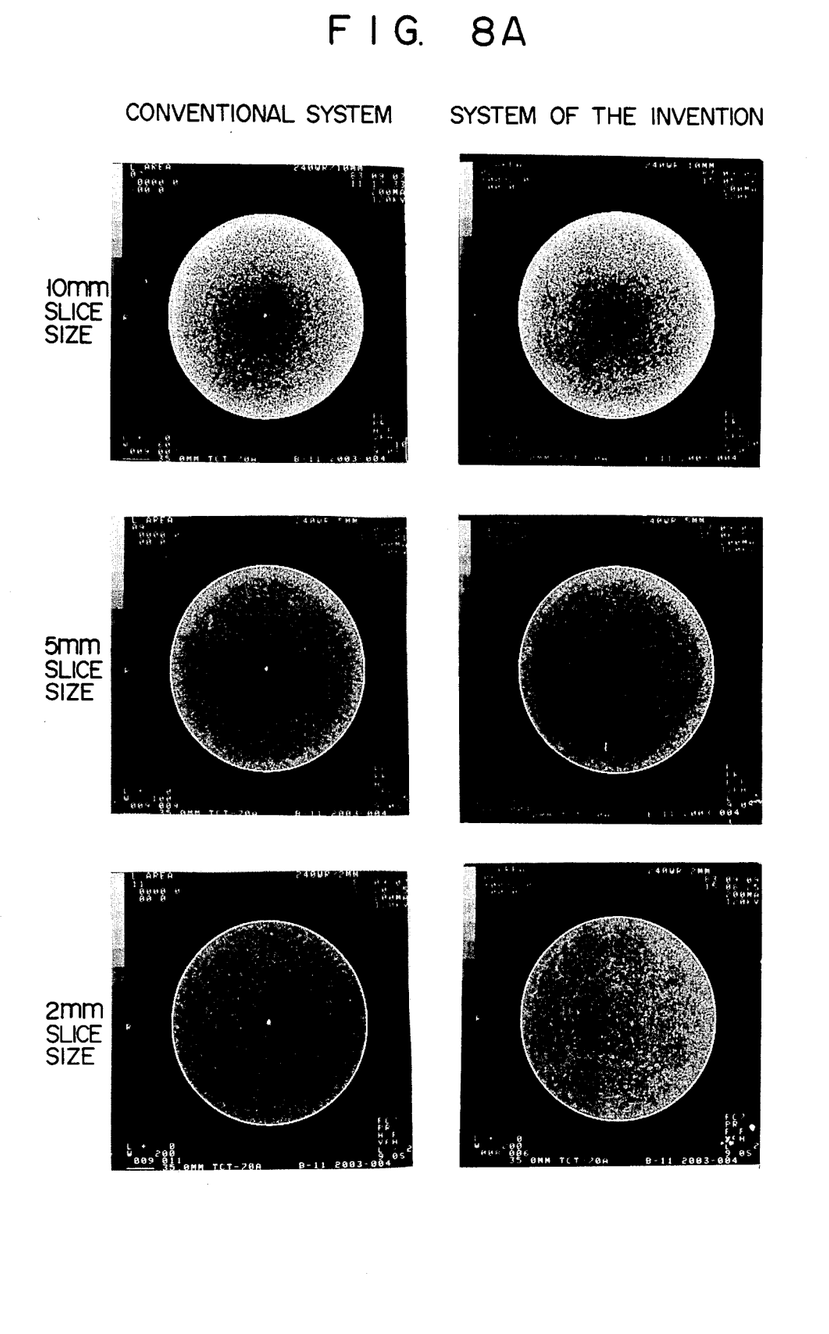
FIGS. 8A and 8B show drawings of experimental results of the present invention in comparison with a conventional system.
Figure 8B:
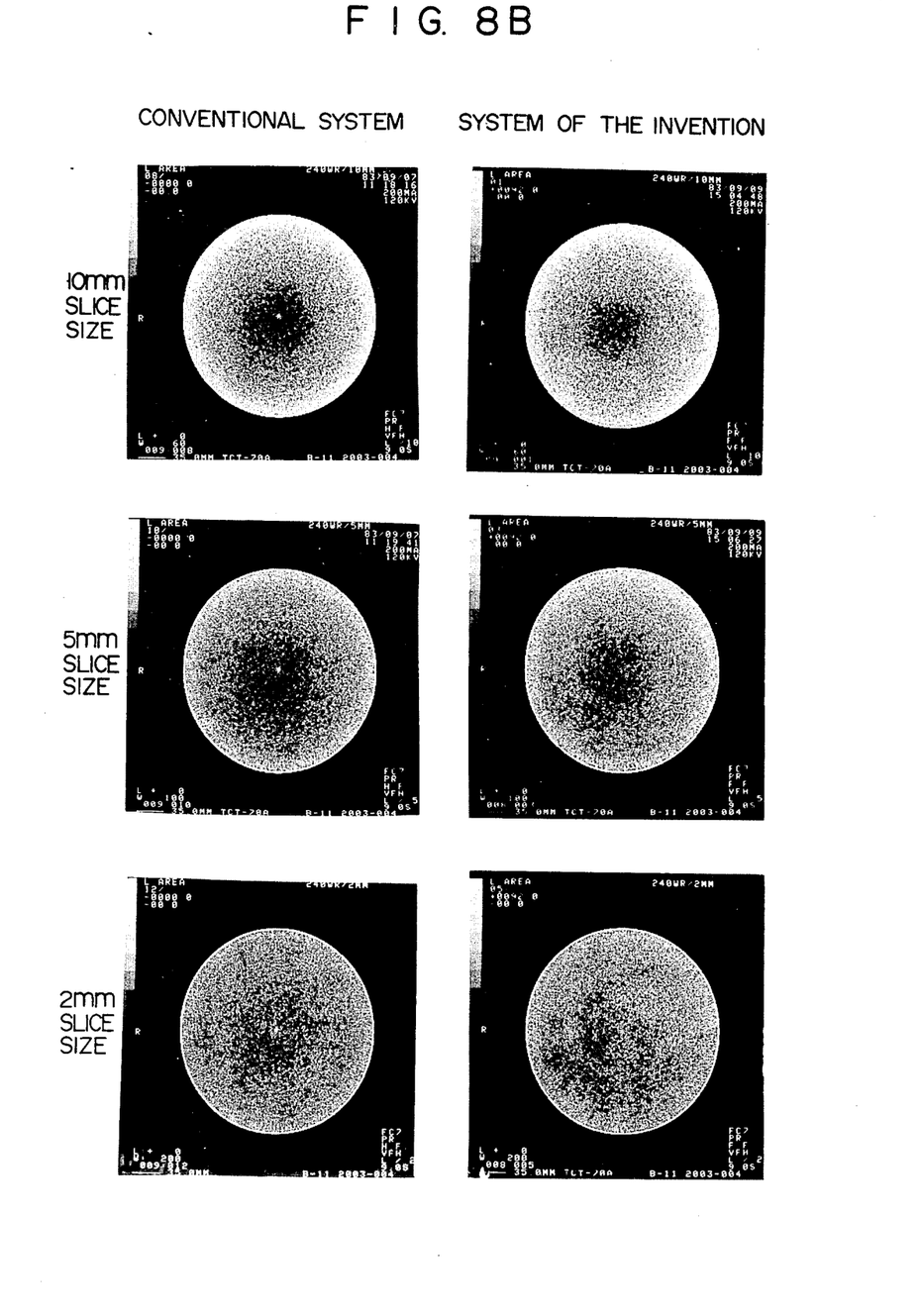

For best understanding the effects of the present invention, the experiment results are shown in FIGS. 8A and 8B. In FIG. 8A, a diameter of the contrast phantom was 240 mm and three different slice sizes were introduced. In FIG. 8B, a diameter of the contrast phantom was 350 mm and also three different slice sizes were employed. Those contrast phantoms were tested by the same X-ray scanning apparatus according to the present invention.

It can be seen from FIGS. 8A and 8B that the point-shaped artifact appears near center of each conventional tomographic image.

While the invention has been described in terms of certain preferred embodiments and exemplified with respect thereto, those skilled in the art will readily appreciate that various modifications, changes, omissions, and substitutions may be made without departing from the spirit of the invention.

As shown in FIG. 2 by the dot and dash line, it is also possible to further employ a selector 100 and a system control unit 18A that is connected in parallel to the previously described system control unit 17A. Those system control units 17A and 18A are selectively operated under the control of the selector 100. That is, when the selector 100 is actuated to select the system control unit 18A so as to control the entire system of the apparatus, the A/D conversion commences from the central channel region, e.g., channels 160 and 161, toward the peripheral channel region, e.g., channels 1 and 320. If the other system control unit 17A is selected, the sequence of the A/D conversion is performed in the direction opposite to the just-described direction.

There are advantages in this embodiment that when the normal diagnosis is performed, the system control unit 17A is made operative, and if the diagnosis portion exists in the peripheral biological region of the patient, the other system control unit 18A is brought into operation. As a result, the accurate diagnosis can be achieved by obtaining the resultant tomographic images containing no artifact.

It is very obvious that the principle of this modification can also be applied to the second and third embodiments without departing from the technical scope and spirit of the present invention.

What is claimed is:

1. An X-ray scanning apparatus comprising:
generation means for producing a fan-shaped X-ray;
detection means including a plurality of detection channels having at least central and peripheral channel regions with respect to an entire detection region thereof, for detecting said fan-shaped X-ray as an X-ray transmission image that has penetrated through an object under investigation so as to transform said X-ray transmission image into X-ray transmission data signals, said detection channels being electrically divided into at least first and second subchannel groups, each of which involves said central and peripheral channel regions;
data acquisition means including at least first and second multiplexers respectively connected to one of said at least first and second subchannel groups, at least first and second A/D converters each respectively connected to said at least first and second multiplexers, and a system control unit connected to said at least first and second multiplexers and A/D converters, whereby A/D conversions of said at least first and second A/D converters are controlled under said system control unit in such a manner that said X-ray transmission data signals derived from said peripheral channel regions of said detection channels are converted prior to conversion of X-ray transmission signals from said central regions;
reconstruction means for reconstructing an X-ray tomographic image of the object by receiving a plurality of said X-ray transmission data signals that have been converted by said at least first and second A/D converters; and
monitor means for displaying said tomographic image of the object.

2. An apparatus as claimed in claim 1, wherein said data acquisition means further comprises at least first and second preamplifier/integrators each of which is interposed between the detection means and a corresponding one of said at least first and second multiplexers respectively, whereby said detected X-ray transmission data signals are integrated and amplified to given signal levels.

3. An apparatus as claimed in claim 2, wherein said at least first and second integrators have integration time constants of approximately 0.319 seconds.

4. An apparatus as claimed in claim 1, wherein said data acquisition means further comprises an inteface unit which is connected to said at least first and second A/D converters so as to temporarily store said X-ray transmission data signals and deliver said X-ray transmission data signals one by one to said reconstruction means.

5. An apparatus as claimed in claim 1, wherein said detection means includes 320 detection channels, said first subchannel group covers the 1st through 160th detection channels, and said second subchannel group covers the 161st through 320th detection channels.

6. An apparatus as claimed in claim 1, wherein said detection means includes 320 detection channels, said first subchannel group covers the 81st through 240th detection channels, and said second subchannel group covers the 241st through 320th and also the 1st through 80th detection channels.

7. An apparatus as claimed in claim 1, wherein said at least first and second A/D converters each have A/D conversion rates of 16 microseconds per channel.

8. An apparatus as claimed in claim 1, wherein said data acquisition means further comprises a second system control unit connected in parallel to said first system control unit, and a selector connected to control said first and second system control units in such a manner that when said first system control unit is in operation, said X-ray transmission data signals are first converted by the parallel A/D conversion of said at least first and second A/D converters, said X-ray transmission signals being derived from the peripheral channel regions of said detection channels, and when said second system control unit is in operation, said X-ray transmission data signals are first converted by the parallel A/D conversion of said at least first and second A/D converters, said signals being derived from the central regions of said detection channels.

9. An apparatus as recited in claim 1 wherein the number of said A/D converters is less than the number of said detection channels.

10. An apparatus as recited in claim 9 wherein the number of said A/D converters is less than one tenth the number of said detection channels.

11. An X-ray scanning apparatus comprising:
generation means for producing a fan-shaped X-ray;
detection means including a plurality of detection channels having at least central and peripheral channel regions with respect to an entire detection region thereof, for detecting said fan-shaped X-ray as an X-ray transmission image that has penetrated through an object under investigation so as to transform said X-ray transmission image into an X-ray transmission data signal, said detection channels being electrically divided into at least four equal subchannel groups based upon odd and even-numbered channels;
data acquisition means incuding a plurality of preamplifier/integrators each connected to a corresponding one of said subchannel groups, a plurality of multiplexers each connected to a corresponding one of said plurality of preamplifier/integrators, a plurality of A/D converters each connected to a corresponding one of said multiplexers, and a system control unit connected to all of said preamplifier/integrators, multiplexers and A/D converters, whereby A/D conversions of said A/D converters are controlled under said system control unit in such a manner that said A/D converters are operated in parallel to first convert X-ray transmission data signals derived from said peripheral channel regions of said at least four subchannel groups having the odd and even-numbered channels;
reconstruction means for reconstructing a tomographic image of said object by receiving a plurality of X-ray transmission data signals that have been converted by said A/D converters; and
monitor means for displaying said tomographic image of said object.

12. An apparatus as claimed in claim 11, wherein said data acquisition means further comprises an interface unit which is connected to said plurality of A/D converters so as to temporarily store said X-ray transmission data signals and deliver them one by one to said reconstruction means.

13. An apparatus as claimed in claim 11, wherein said detection means includes 320 detection channels, a first one of said subchannel groups covers the 1st through 159th odd-numbered detection channels, a second one of said subchannel groups covers the 2nd through 160th even-numbered detection channels, a third one of said subchannel groups covers the 161st through 319th odd-numbered detection channels, and a fourth one of said subchannel groups covers the 162nd through 320th even-numbered detection channels.

14. An apparatus as claimed in claim 11, wherein each of said A/D converters has a per channel A/D conversion rate of 16 micro-seconds.

15. An apparatus as claimed in claim 11, wherein each of said integrators has an integration time constant of approximately 0.319 second.

16. An apparatus as recited in claim 11 wherein the number of said A/D converters is less than the number of said detection channels.

17. An apparatus as recited in claim 16 wherein the number of said A/D converters is less than one tenth the number of said detection channels.

18. A method for generating a computerized tomographic X-ray image of an object under investigation, comprising the steps of:
transmitting a fan-shaped X-ray through said object;
receiving said fan-shaped X-ray as an X-ray transmission image so as to transform said X-ray transmission image into analogue X-ray transmission signals, said receiving step being performed by a plurality of detection channels electrically divided into at least first and second subchannel groups each having a central region and a peripheral region;
converting said X-ray transmission signals to digital form, X-ray transmission signals from said at least first and second subchannel groups being converted in parallel, X-ray transmission signals from said peripheral regions within each of said subchannel groups being converted prior to X-ray transmission signals from said central regions;
reconstructing an X-ray tomographic image of said object from said converted X-ray transmission signals; and
displaying said tomographic image.

* * * * *